United States Patent
Bohnen et al.

(10) Patent No.: US 6,576,723 B1
(45) Date of Patent: Jun. 10, 2003

(54) CATALYST SYSTEM AND ITS USE FOR THE POLYMERIZATION OF PROPYLENE

(75) Inventors: Hans Bohnen, Moers (DE); Markus Göres, Eschborn (DE); Cornelia Fritze, Frankfurt (DE)

(73) Assignee: Basell Polyolefine GmbH, Ludwigshafen (DE)

( * ) Notice: Subject to any disclaimer, the term of this patent is extended or adjusted under 35 U.S.C. 154(b) by 0 days.

(21) Appl. No.: 09/700,425

(22) PCT Filed: May 18, 1999

(86) PCT No.: PCT/EP99/03416

§ 371 (c)(1),
(2), (4) Date: Nov. 15, 2000

(87) PCT Pub. No.: WO99/61487

PCT Pub. Date: Dec. 2, 1999

(30) Foreign Application Priority Data

May 23, 1998  (DE) .......................... 198 23 171
May 23, 1998  (DE) .......................... 198 23 172

(51) Int. Cl.$^7$ ................................. C08F 4/12
(52) U.S. Cl. .................. 526/131; 526/148; 526/160; 526/161; 526/169; 526/141; 526/139; 526/151; 526/152; 526/153; 526/126; 526/904; 526/351; 526/905; 526/943
(58) Field of Search ................. 526/160, 161, 526/169, 131, 139, 141, 148, 151, 152, 153, 126, 904, 905, 943, 351

(56) References Cited

U.S. PATENT DOCUMENTS

| | | | |
|---|---|---|---|
| 5,278,264 A | 1/1994 | Spaleck et al. | 526/127 |
| 5,329,033 A | 7/1994 | Spaleck et al. | 556/53 |
| 5,414,180 A * | 5/1995 | Geerts et al. | 585/525 |
| 5,648,440 A * | 7/1997 | Sugano et al. | 526/132 |
| 5,770,753 A | 6/1998 | Kueber et al. | 556/11 |
| 5,786,432 A | 7/1998 | Kueber et al. | 526/127 |
| 5,840,644 A * | 11/1998 | Kuber et al. | 502/117 |
| 6,417,302 B1 * | 7/2002 | McElfresh | 526/160 |
| 6,482,902 B1 * | 11/2002 | Bohnen et al. | 526/127 |
| 6,500,908 B1 * | 12/2002 | Bohnen et al. | 526/160 |

FOREIGN PATENT DOCUMENTS

| | | | |
|---|---|---|---|
| DE | 197 33017 | 2/1999 | |
| DE | 197 33 017 A1 * | 2/1999 | ............ C07F/5/06 |
| EP | 530 647 | 3/1993 | |
| EP | 576 970 | 1/1994 | |
| EP | 601 830 | 6/1994 | |
| EP | 653 433 | 5/1995 | |
| WO | 91/09882 | 7/1991 | |
| WO | 96/00243 | 1/1996 | |
| WO | 96/04290 | 2/1996 | |
| WO | 99/40129 | 8/1999 | |

OTHER PUBLICATIONS

Bohnen et al., U.S. application Ser. No. 09/600,313 "Catalyst System" (filing date: Feb. 05, 1999).
J.of Organomet. Chem., 232 (1982) 233–247, Wild et al.
Stereochemistry of Metallocenes, Schloegl,40–91.
J.Am.Chem.Soc. 1995,117,6465–6474,Harlan et al.
Organometallics 1994,13,2957–2969:Harlan et al.

* cited by examiner

*Primary Examiner*—David W. Wu
*Assistant Examiner*—Rip A Lee
(74) *Attorney, Agent, or Firm*—Keil & Weinkauf

(57) ABSTRACT

A catalyst system which can be used in the polymerization of propylene comprises at least one metallocene as a rac/meso isomer mixture, at least one organoboroaluminum compound, at least one passivated support, at least one Lewis base and, if desired, at least one further organometallic compound.

8 Claims, No Drawings

CATALYST SYSTEM AND ITS USE FOR THE POLYMERIZATION OF PROPYLENE

The present invention relates to catalyst systems and their use in the polymerization of propylene.

Processes for preparing polyolefins with the aid of soluble, homogeneous catalyst systems comprising a transition metal component of the metallocene type and a cocatalyst component such as an aluminoxane, a Lewis acid or an ionic compound are known. These catalysts have a high activity and give polymers and copolymers having a narrow molar mass distribution.

In polymerization processes using soluble, homogeneous catalyst systems, thick deposits are formed on reactor walls and stirrers if the polymer is obtained as a solid. These deposits are formed by agglomeration of polymer particles whenever metallocene and/or cocatalysts are present in dissolved form in the suspension. Such deposits in the reactor systems have to be removed regularly since they quickly attain considerable thicknesses, have a high strength and prevent heat transfer to the cooling medium. Such homogeneous catalyst systems cannot be used in modern industrial polymerization processes in the liquid monomer or in the gas phase.

To avoid deposit formation in the reactor, it has been proposed that supported catalyst systems in which the metallocene and/or the aluminum compounds serving as cocatalyst are immobilized on an inorganic support material be used.

EP-A-0,576,970 discloses metallocenes and corresponding supported catalyst systems.

Highly active supported catalyst systems for preparing industrially important polyolefins having high tacticity and a high melting point, in particular polypropylenes, comprise ansa-metallocenes in racemic or pseudoracemic form and are known, for example, from EP-A-0,530,647; EP-A-0,576,970 and EP-A-0,653,433.

Ansa-Metallocenes are obtained in the synthesis as isomer mixtures (rac form and meso form or pseudo rac/pseudo meso form), so that an additional and complicated process step for separating rac and meso forms (or the pseudo forms) is necessary. A definition of the terms rac form and meso form may be found in Brinzinger et al., Journal of Organometallic Chemistry, 232 (1982) page 233 and Schlögl, Top. Stereochem., 1 (1967) page 39 ff.

In addition, methylaluminoxane (MAO) as hitherto the most effective cocatalyst has the disadvantage of having to be used in a large excess. Such aluminoxanes are described, for example, in JACS 117 (1995), 6465–74, Organometallics 13 (1994), 2957–2969.

The preparation of cationic alkyl complexes opens a route to MAO-free catalysts having comparable activity in which the cocatalyst can be used in a virtually stochiometric amount.

Industrial utilization of metallocene catalysts necessitates, as described above, their conversion into a heterogeneous catalyst system in order to ensure an appropriate morphology of the resulting polymer. The application of cationic metallocene catalysts based on borate anions to supports is described in WO-91/09882. Here, the catalyst system is formed by application of a dialkyl-metallocene compound and a Brönsted-acid, quaternary ammonium compound having a noncoordinating anion such as tetrakispentafluorophenylborate to an inorganic support. The support material is modified beforehand using a trialkylaluminum compound. A disadvantage of this process for application to a support is that only a small part of the metallocene used is immobilized by physisorbtion on the support material. When the catalyst system is introduced into the reactor, the metallocene can easily be leached from the support surface. This leads to a polymerization which occurs partly homogeneously, resulting in an unsatisfactory morphology of the polymer.

It is an object of the present invention to find an inexpensive, highly active catalyst system for the preparation of polypropylene having high tacticity and a high melting point and also to provide a simple and economical process for preparing such a catalyst system, which process requires no additional separation of rac and meso forms of the metallocene components present and does not use aluminoxanes such as methylaluminoxane (MAO) as cocatalyst.

We have found that this object is achieved by a catalyst system comprising at least one metallocene as rac/meso isomer mixture, at least one organoboroaluminum compound, at least one passivated support, at least one Lewis base and, if desired, at least one further organometallic compound.

The present invention accordingly provides a catalyst system comprising a) at least one substituted metallocene of the formula A

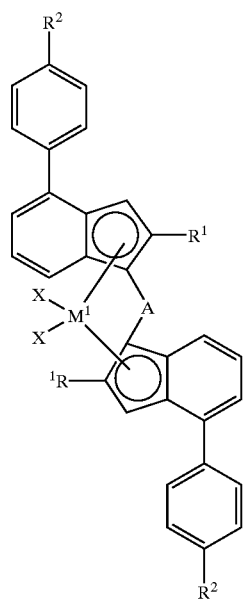

(A)

where

R$^1$ and R$^2$ are identical or different and are each a hydrogen atom, a C$_1$–C$_{20}$-hydrocarbon group such as a C$_1$–C$_{20}$-alkyl group, preferably methyl, ethyl, n-propyl, isopropyl, n-butyl, sec-butyl, isobutyl, tert-butyl, pentyl or hexyl, a C$_6$–C$_{14}$-aryl group or a C$_2$–C$_{20}$-alkenyl group, with the proviso that R$^1$ is not methyl when R$^2$ is hydrogen, M$^1$ is a transition metal of group 4, 5 or 6 of the Periodic Table of the Elements, for example titanium, zirconium, hafnium, vanadium, niobium, tantalum, chromium, molybdenum or tungsten, preferably titanium, zirconium or hafnium, particularly preferably zirconium, A is a bridge of the formula

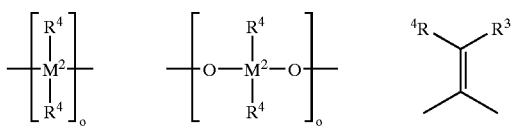

or =BR³, AIR³, —S—, —SO—, —SO₂—, =NR³, =PR³, =P(O)R³, o-phenylene, 2,2'-biphenylene, where M² is carbon, silicon, germanium, tin, nitrogen or phosphorus, preferably carbon, silicon or germanium, in particular carbon or silicon, o is 1, 2, 3 or 4, preferably 1 or 2, R³ and R⁴ are identical or different and are each, independently of one another, a hydrogen atom, halogen, a $C_1$–$C_{20}$ group such as $C_1$–$C_{20}$-alkyl, in particular a methyl group, $C_6$–$C_{14}$-aryl, in particular a phenyl or naphthyl group, $C_1$–$C_{10}$-alkoxy, $C_2$–$C_{10}$-alkenyl, $C_7$–$C_{20}$-arylalkyl, $C_7$–$C_{20}$-alkylaryl, $C_6$–$C_{10}$-aryloxy, $C_1$–$C_{10}$-fluoroalkyl, $C_6$–$C_{10}$-haloaryl, $C_2$–$C_{10}$-alkynyl, $C_3$–$C_{20}$-alkylsilyl, for example trimethylsilyl, triethylsilyl or tert-butyldimethylsilyl, $C_3$–$C_{20}$-arylsilyl, for example triphenylsilyl, or $C_3$–$C_{20}$-alkylarylsilyl, for example dimethylphenylsilyl, diphenylsilyl or diphenyl-tert-butylsilyl, or R³ and R⁴ may together form a monocyclic or polycyclic ring system, and A is preferably dimethylsilanediyl, dimethylgermanediyl, ethylidene, methylethylidene, 1,1-dimethylethylidene, 1,2-dimethylethylidene, tetramethylethylidene, isopropylidene, phenylmethylmethylidene, diphenylmethylidene, particularly preferably dimethylsilanediyl, dimethylgermanediyl or ethylidene, X are identical or different and are each a hydrogen atom, a halogen atom such as fluorine, chlorine, bromine or iodine, a hydroxyl group, a $C_1$–$C_{10}$-alkyl group such as methyl, ethyl, propyl, isopropyl, n-butyl, isobutyl, sec-butyl, tert-butyl, hexyl or cyclohexyl, a $C_6$–$C_{15}$-aryl group such as phenyl or naphthyl, a $C_1$–$C_{10}$-alkoxy group such as methoxy, ethoxy or tert-butoxy, a $C_6$–$C_{15}$-aryloxy group, a benzyl group, an $NR^5{}_2$ group, where R⁵ are identical or different and are each a $C_1$–$C_{10}$-alkyl group, in particular methyl and/or ethyl, a $C_6$–$C_{15}$-aryl group, a $(CH_3)_3Si$ group, preferably a chlorine atom, a fluorine atom, a methyl group, a benzyl group or an NMe₂ group, particularly preferably a chlorine atom or a methyl group, where the ratio of rac isomer to meso isomer of the metallocene of the formula (A) in the novel catalyst system is from 1:10 to 2:1, preferably from 1:2 to 3:2, b) at least one Lewis base of the formula I, $$M^3R^6R^7R^8 \qquad (I)$$

where

R⁶, R⁷ and R⁸ are identical or different and are each a hydrogen atom, a $C_1$–$C_{20}$-alkyl group, a $C_1$–$C_{20}$-haloalkyl group, a $C_6$–$C_{40}$-aryl group, a $C_6$–$C_{40}$-haloaryl group, a $C_7$–$C_{40}$-alkylaryl group or a $C_7$–$C_{40}$-arylalkyl group, where two radicals or all three radicals R⁶, R⁷ and R⁸ may be joined to one another via $C_2$–$C_{20}$ units and M³ is an element of main group V of the Periodic Table of the Elements, c) a support, d) at least one organoboroaluminum compound which is made up of units of the formula II $$R_i^9M^4—O—M^4R_j^{10} \qquad (II)$$

where

R⁹ and R¹⁰ are identical or different and are each a hydrogen atom, a halogen atom, a $C_1$–$C_{40}$ group, in particular $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl or $C_7$–$C_{40}$-haloalkylaryl, or R⁹ may be an —OSiR₃ group, where R are identical or different and are as defined for R⁹, M⁴ are identical or different and are each an element of main group 3 of the Periodic Table of the Elements and i and j are each an integer 0, 1 or 2, and is covalently bound to the support, and, if desired, e) an organometallic compound of the formula V $$[M^5R^{11}{}_p]_k \qquad (V)$$

where

M⁵ is an element of main group I, II or III of the Periodic Table of the Elements, R¹¹ are identical or different and are each a hydrogen atom, a halogen atom or a $C_1$–$C_{40}$ group, in particular a $C_1$–$C_{20}$-alkyl group, a $C_6$–$C_{40}$-aryl group, a $C_7$–$C_{40}$-arylalkyl group or a $C_7$–$C_{40}$-alkylaryl group, p is an integer from 1 to 3 and k is an integer from 1 to 4.

The Lewis bases of the formula (I) are preferably ones in which M³ is nitrogen or phosphorus. Examples of such compounds are triethylamine, triisopropylamine, triisobutylamine, tri(n-butyl)amine, N,N-dimethylaniline, N,N-diethylaniline, N,N-2,4,6-pentamethylaniline, dicyclohexylamine, pyridine, pyrazine, triphenylphosphine, tri(methylphenyl)phosphine and tri(dimethylphenyl) phosphine.

The support component of the catalyst system of the present invention can be any organic or inorganic, inert solid, in particular a porous support such as talc, inorganic oxides and finely divided polymer powders (e.g. polyolefins).

Suitable inorgainc oxides may be found among the oxides of elements of groups 2,3,4,5,13,14,15 and 16 of the Periodic Table of the Elements. Examples of oxides preferred as support include silicon dioxide, aluminum oxide and mixed oxides of the two elements and corresponding oxide mixtures. Other inorganic oxides, which may be used either alone or in combination with the abovementioned preferred oxidic supports, are for example, MgO, ZrO₂, TiO₂ or B₂O₃, to name only a few.

The support materials used have a specific surface area in the range from 10 to 1000 m²/g, a pore volume in the range from 0.1 to 5 ml/g and a mean particle size of from 1 to 500 µm. Preference is given to supports having a specific surface area in the range from 50 to 500 µm, a pore volume in the range from 0.5 to 3.5 ml/g and a mean particle size in the range from 5 to 350 µm. Particular preference is given to supports having a specific surface area in the range from 200 to 400 m²/g, a pore volume in the range from 0.8 to 3.0 ml/g and a mean particle size of from 10 to 200 µm.

If the support material used naturally has a low moisture content or residual solvent content, dehydration or drying prior to use can be omitted. If this is not the case, for example when using silica gel as support material, dehydration or drying is advisable. Thermal dehydration or drying of the support material can be carried out under reduced pressure with simultaneous inert gas blanketing (e.g. nitrogen). The drying temperature is in the range from 100 to 1000° C., preferably from 200 to 800° C. In this case, the parameter pressure is not critical. The duration of the drying process can be from 1 to 24 hours. Shorter or longer drying times are possible, provided that equilibrium with the hydroxyl groups on the support surface can be established under the conditions selected, which normally takes from 4 to 8 hours.

Dehydration or drying of the support material can also be carried out by chemical means by reacting the absorbed water and the hydroxyl groups on the surface with suitable passivating agents. The reaction with the passivating reagent can convert all or some of the hydroxyl groups into a form which leads to no adverse interaction with the catalytically active centers. Suitable passivating agents are, for example, silicon halides and silanes, e.g. silicon tetrachloride, chlorotrimethylsilane, dimethylaminotrichlorosilane, or organometallic compounds of aluminum, boron and magnesium, for example trimethylaluminum, triethylaluminum, triisobutylaluminum, triethylborane, dibutylmagnesium. Chemical dehydration or passivation of the support material is carried out, for example, by reacting a suspension of the support material in a suitable solvent in the absence of air and moisture with the passivating reagent in pure form or as a solution in a suitable solvent. Suitable solvents are, for example, aliphatic or aromatic hydrocarbons such as pentane, hexane, heptane, toluene or xylene. Passivation is carried out at from 25° C. to 120° C., preferably from 50 to 70° C. Higher and lower temperatures are possible. The reaction time is from 30 minutes to 20 hours, preferably from 1 to 5 hours. After chemical dehydration is complete, the support material is isolated by filtration under inert conditions, washed one or more times with suitable inert solvents as have been described above and subsequently dried in a stream of inert gas or under reduced pressure.

Organic support materials such as finely divided polyolefin powders (e.g. polyethylene, polypropylene or polystyrene) can also be used and should likewise be freed of adhering moisture, solvent residues or other impurities by means of appropriate purification and drying operations prior to use.

The catalyst system of the present invention comprises, as cocatalytically active chemical compound, at least one organoboroaluminum compound comprising units of the formula (II). Preference is given to compounds of the formula (II) in which $M^3$ is boron or aluminum.

The compound comprising units of the formula (II) may be in the form of a monomer or a linear, cyclic or cage-like oligomer. It is also possible for two or more chemical compounds comprising units of the formula (II) to form dimers, trimers or higher associates with one another by means of Lewis acid-Lewis base interactions or condensation reactions. It is also possible to use mixtures of the compounds described.

Preferred cocatalytically active organoboroaluminum compounds d) correspond to the formulae (III) and (IV),

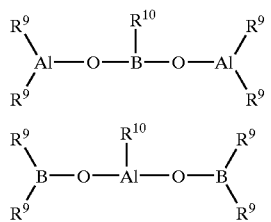

where $R^9$ and $R^{10}$ are as defined under formula (II).

Examples of cocatalytically active compounds of the formulae (III) and (IV) are

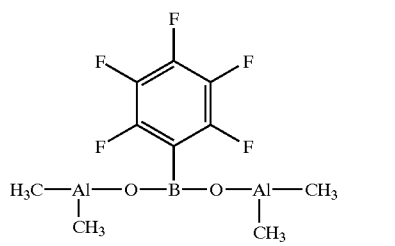

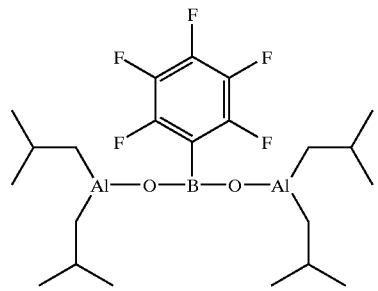

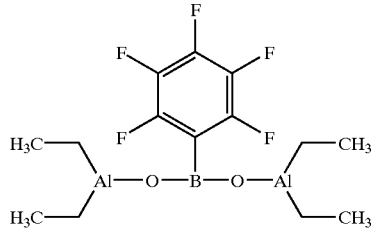

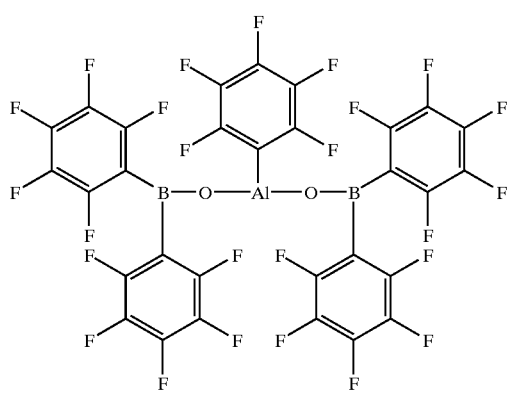

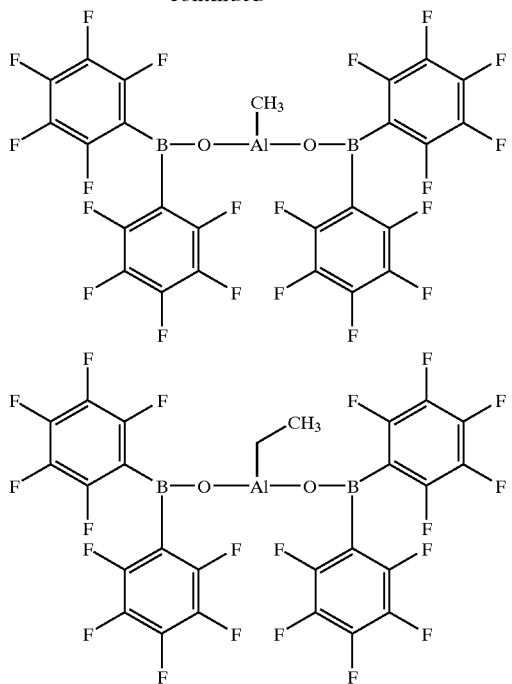

The organometallic compounds of the formula (IV) are preferably uncharged Lewis acids in which $M^5$ is lithium, magnesium and/or aluminum, in particular aluminum.

Examples of preferred organometallic compounds of the formula (V) are trimethylaluminum, triethylaluminum, triisopropylaluminum, trihexylaluminum, trioctylaluminum, tri-n-butylaluminum, tri-n-propylaluminum, triisoprenaluminum, dimethylaluminum monochloride, diethylaluminum monochloride, diisobutylaluminum monochloride, methylaluminum sesquichloride, ethylaluminum sesquichloride, dimethylaluminum hydride, diethylaluminum hydride, diisopropylaluminum hydride, dimethylaluminum trimethylsiloxide, dimethylaluminum triethylsiloxide, phenylalane, pentafluorophenylalane and o-tolylalane.

The metallocene of the formula (A) is preferably one of the following compounds:
dimethylsilanediylbis(2-methyl-4-(4'-tert-butylphenyl)indenyl)zirconium dichloride
dimethylsilanediylbis(2-methyl-4-(4'-tert-butylphenyl)indenyl)hafnium dichloride
dimethylsilanediylbis(2-methyl-4-(4'-tert-butylphenyl)indenyl)titanium dichloride
dimethylsilanediylbis(2-methyl-4-(4'-methylphenyl)indenyl)zirconium dichloride
dimethylsilanediylbis(2-methyl-4-(4'-ethylphenyl)indenyl)zirconium dichloride
dimethylsilanediylbis(2-methyl-4-(4'-n-propylphenyl)indenyl)zirconium dichloride
dimethylsilanediylbis(2-methyl-4-(4'-isopropylphenyl)indenyl)zirconium dichloride
dimethylsilanediylbis(2-methyl-4-(4'-n-butylphenyl)indenyl)zirconium dichloride
dimethylsilanediylbis(2-methyl-4-(4'-hexylphenyl)indenyl)zirconium dichloride
dimethylsilanediylbis(2-methyl-4-(4'-sec-butylphenyl)indenyl)zirconium dichloride
dimethylsilanediylbis(2-methyl-4-phenyl)indenyl)zirconium dichloride
dimethylsilanediylbis(2-ethyl-4-(4'-methylphenyl)indenyl)zirconium dichloride
dimethylsilanediylbis(2-ethyl-4-(4'-ethylphenyl)indenyl)zirconium dichloride
dimethylsilanediylbis(2-ethyl-4-(4'-n-propylphenyl)indenyl)zirconium dichloride
dimethylsilanediylbis(2-ethyl-4-(4'-isopropylphenyl)indenyl)zirconium dichloride
dimethylsilanediylbis(2-ethyl-4-(4'-n-butylphenyl)indenyl)zirconium dichloride
dimethylsilanediylbis(2-ethyl-4-(4'-hexylphenyl)indenyl)zirconium dichloride
dimethylsilanediylbis(2-ethyl-4-(4'-pentylphenyl)indenyl)zirconium dichloride
dimethylsilanediylbis(2-ethyl-4-(4'-cyclohexylphenyl)indenyl)zirconium dichloride
dimethylsilanediylbis(2-ethyl-4-(4'-sec-butylphenyl)indenyl)zirconium dichloride
dimethylsilanediylbis(2-ethyl-4-(4'-tert-butylphenyl)indenyl)zirconium dichloride
dimethylsilanediylbis(2-n-propyl-4-phenyl)indenyl)zirconium dichloride
dimethylsilanediylbis(2-n-propyl-4-(4'-methylphenyl)indenyl)zirconium dichloride
dimethylsilanediylbis(2-n-propyl-4-(4'-ethylphenyl)indenyl)zirconium dichloride
dimethylsilanediylbis(2-n-propyl-4-(4'-n-propylphenyl)indenyl)zirconium dichloride
dimethylsilanediylbis(2-n-propyl-4-(4'-isopropylphenyl)indenyl)zirconium dichloride
dimethylsilanediylbis(2-n-propyl-4-(4'-n-butylphenyl)indenyl)zirconium dichloride
dimethylsilanediylbis(2-n-propyl-4-(4'-hexylphenyl)indenyl)zirconium dichloride
dimethylsilanediylbis(2-n-propyl-4-(4'-cyclohexylphenyl)indenyl)zirconium dichloride
dimethylsilanediylbis(2-n-propyl-4-(4'-sec-butylphenyl)indenyl)zirconium dichloride
dimethylsilanediylbis(2-n-propyl-4-(4'-tert-butylphenyl)indenyl)zirconium dichloride
dimethylsilanediylbis(2-n-butyl-4-phenyl)indenyl)zirconium dichloride
dimethylsilanediylbis(2-n-butyl-4-(4'-methylphenyl)indenyl)zirconium dichloride
dimethylsilanediylbis(2-n-butyl-4-(4'-ethylphenyl)indenyl)zirconium dichloride
dimethylsilanediylbis(2-n-butyl-4-(4'-n-propylphenyl)indenyl)zirconium dichloride
dimethylsilanediylbis(2-n-butyl-4-(4'-isopropylphenyl)indenyl)zirconium dichloride
dimethylsilanediylbis(2-n-butyl-4-(4'-n-butylphenyl)indenyl)zirconium dichloride
dimethylsilanediylbis(2-n-butyl-4-(4'-hexylphenyl)indenyl)zirconium dichloride
dimethylsilanediylbis(2-n-butyl-4-(4'-cyclohexylphenyl)indenyl)zirconium dichloride
dimethylsilanediylbis(2-n-butyl-4-(4'-sec-butylphenyl)indenyl)zirconium dichloride
dimethylsilanediylbis(2-n-butyl-4-(4'-tert-butylphenyl)indenyl)zirconium dichloride
dimethylsilanediylbis(2-hexyl-4-phenyl)indenyl)zirconium dichloride
dimethylsilanediylbis(2-hexyl-4-(4'-methylphenyl)indenyl)zirconium dichloride
dimethylsilanediylbis(2-hexyl-4-(4'-ethylphenyl)indenyl)zirconium dichloride
dimethylsilanediylbis(2-hexyl-4-(4'-n-propylphenyl)indenyl)zirconium dichloride dimethylsilanediylbis(2-hexyl-4-(4'-isopropylphenyl) indenyl)zirconium dichloride
dimethylsilanediylbis(2-hexyl-4-(4'-n-butylphenyl) zirconium dichloride
dimethylsilanediylbis(2-hexyl-4-(4'-hexylphenyl)indenyl) zirconium dichloride
dimethylsilanediylbis(2-hexyl-4-(4'-cyclohexylphenyl) indenyl)zirconium dichloride
dimethylsilanediylbis(2-hexyl-4-(4'-sec-butylphenyl) indenyl)zirconium dichloride
dimethylsilanediylbis(2-hexyl-4-(4'-tert-butylphenyl) indenyl)zirconium dichloride
dimethylsilanediylbis(2-methyl-4-(4'-tert-butylphenyl) indenyl)zirconium bis(dimethylamide)
dimethylsilanediylbis(2-ethyl-4-(4'-tert-butylphenyl) indenyl)dibenzylzirconium
dimethylsilanediylbis(2-methyl-4-(4'-tert-butylphenyl) indenyl)dimethylzirconium
imethylgermanediylbis(2-ethyl-4-(4'-tert-butylphenyl) indenyl)zirconium dichloride
dimethylgermanediylbis(2-ethyl-4-(4'-tert-butylphenyl) indenyl) hafnium dichloride
dimethylgermanediylbis(2-propyl-4-(4'-tert-butylphenyl) indenyl)titanium dichloride
dimethylgermanediylbis(2-methyl-4-(4'-tert-butylphenyl) indenyl)zirconium dichloride
ethylidenebis(2-ethyl-4-phenyl)indenyl)zirconium dichloride
ethylidenebis(2-ethyl-4-(4'-tert-butylphenyl)indenyl) zirconium dichloride
ethylidenebis(2-n-propyl-4-(4'-tert-butylphenyl)indenyl) zirconium dichloride
ethylidenebis(2-n-butyl-4-(4'-tert-butylphenyl)indenyl) titanium dichloride
ethylidenebis(2-hexyl-4-(4'-tert-butylphenyl)indenyl) dibenzylzirconium
ethylidenebis(2-ethyl-4-(4'-tert-butylphenyl)indenyl) dibenzylhafnium
ethylidenebis(2-methyl-4-(4'-tert-butylphenyl)indenyl) dibenzyltitanium
ethylidenebis(2-methyl-4-(4'-tert-butylphenyl)indenyl) zirconium dichloride
ethylidenebis(2-ethyl-4-(4'-tert-butylphenyl)indenyl) dimethylhafnium
ethylidenebis(2-n-propyl-4-phenyl)indenyl) dimethyltitanium
ethylidenebis(2-ethyl-4-(4'-tert-butylphenyl)indenyl) zirconium bis(dimethylamide)
ethylidenebis(2-ethyl-4-(4'-tert-butylphenyl)indenyl) hafnium bis(dimethylamide)
ethylidenebis(2-ethyl-4-(4'-tert-butylphenyl)indenyl) titanium bis(dimethylamide)
methylethylidenebis(2-ethyl-4-(4'-tert-butylphenyl)indenyl) zirconium dichloride
methylethylidenebis(2-ethyl-4-(4'-tert-butylphenyl) indenyl)hafnium dichloride
phenylphosphinediyl(2-ethyl-4-(4'-tert-butylphenyl) indenyl)zirconium dichloride
phenylphosphinediyl(2-methyl-4-(4'-tert-butylphenyl) indenyl) zirconium dichloride
phenylphosphinediyl(2-ethyl-4-(4'-tert-butylphenyl) indenyl) zirconium dichloride Further examples of metallocenes which can be used according to the present invention are analogues of the above metallocenes in which the zirconium fragment "zirconium dichloride" is replaced by
zirconium monochloride mono(2,4-di-tert-butylphenoxide)
zirconium monochloride mono(2,6-di-tert-butylphenoxide)
zirconium monochloride mono(3,5-di-tert-butylphenoxide)
zirconium monochloride mono(2,6-di-sec-butylphenoxide)
zirconium monochloride mono(2,4-di-methylphenoxide)
zirconium monochloride mono(2,3-di-methylphenoxide)
zirconium monochloride mono(2,5-di-methylphenoxide)
zirconium monochloride mono(2,6-di-methylphenoxide)
zirconium monochloride mono(3,4-di-methylphenoxide)
zirconium monochloride mono(3,5-di-methylphenoxide)
zirconium monochloride monophenoxide
zirconium monochloride mono(2-methylphenoxide)
zirconium monochloride mono(3-methylphenoxide)
zirconium monochloride mono(4-methylphenoxide)
zirconium monochloride mono(2-ethylphenoxide)
zirconium monochloride mono(3-ethylphenoxide)
zirconium monochloride mono(4-ethylphenoxide)
zirconium monochloride mono(2-sec-butylphenoxide)
zirconium monochloride mono(2-tert-butylphenoxide)
zirconium monochloride mono(3-tert-butylphenoxide)
zirconium monochloride mono(4-sec-butylphenoxide)
zirconium monochloride mono(4-tert-butylphenoxide)
zirconium monochloride mono(2-isopropyl-5-methylphenoxide)
zirconium monochloride mono(4-isopropyl-3-methylphenoxide)
zirconium monochloride mono(5-isopropyl-2-methylphenoxide)
zirconium monochloride mono(5-isopropyl-3-methylphenoxide)
zirconium monochloride mono(2,4-bis-(2-methyl-2-butyl) phenoxide)
zirconium monochloride mono(2,6-di-tert-butyl-4-methylphenoxide)
zirconium monochloride mono(4-nonylphenoxide)
zirconium monochloride mono(1-naphthoxide)
zirconium monochloride mono(2-naphthoxide)
zirconium monochloride mono(2-phenylphenoxide)
zirconium monochloride mono(tert-butoxide)
zirconium monochloride mono(N-methylanilide)
zirconium monochloride mono(2-tert-butylanilide)
zirconium monochloride mono(tert-butylamide)
zirconium monochloride mono(di-isopropylamide)
zirconium monochloride monomethyl
zirconium monochloride monobenzyl
zirconium monochloride mononeopentyl.

Preference is also given to the corresponding dimethylzirconium compounds and the corresponding $\eta^4$-butadienezirconium compounds, and also the corresponding compounds having 1,2-(1-methylethanediyl), 1,2-(1,1-dimethylethanediyl) and 1,2(1,2-dimethylethanediyl) bridges.

The ratio of rac isomer to meso isomer of the metallocene component of the formula (A) in the catalyst system of the present invention is in the range from 1:10 to 2:1, preferably from 1:2 to 3:2.

The methods of preparing metallocenes of the formula (A) are described in detail in, for example, Journal of Organometallic Chem. 288 (1985) 63–67 and in the documents cited therein.

The catalyst system of the present invention is obtainable by reaction of a Lewis base of the formula (I) and an organoboroaluminum compound made up of units of the formula (II) with a support. This is followed by reaction with a solution or suspension of one or more metallocene compounds of the formula (VI) and, if desired, one or more organometallic compounds of the formula (V).

The activation of the catalyst system can be carried out either before introduction into the reactor or else only in the reactor itself. The present invention also provides a process for preparing polyolefins. The addition of a further chemical compound which is introduced as additive before the polymerization can also be advantageous.

To prepare the catalyst system of the present invention, the support material is suspended in an organic solvent. Suitable solvents are aromatic or aliphatic solvents, for example hexane, heptane, toluene or xylene, or halogenated hydrocarbons such as methylene chloride or halogenated aromatic hydrocarbons such as o-dichlorobenzene. The support can be pretreated beforehand with a compound of the formula (V). Subsequently, one or more compounds of the formula (I) is/are added to this suspension, with the reaction time being able to be from 1 minute to 48 hours, preferably from 10 minutes to 2 hours. The reaction solution can be isolated and subsequently resuspended or else can be reacted directly with a cocatalytically active organoboroaluminum compound made up of units of the formula (II). The reaction time is from 1 minute to 48 hours, preferably from 10 minutes to 2 hours. Preference is given to using from 1 to 4 equivalents of a Lewis base of the formula (I) per equivalent of a cocatalytically active compound made up of units of the formula (II). Particular preference is given to using one equivalent of a Lewis base of the formula (I) per equivalent of a cocatalytically active compound made up of units of the formula (II). The reaction product of this reaction is a metallocenium-forming compound which is covalently bound to the support material. This will hereinafter be referred to as modified support material. The reaction mixture is subsequently filtered and the solid is washed with one of the abovementioned solvents. The modified support material is then dried in a high vacuum. After drying, the modified support material can be resuspended and aftertreated with a compound of the formula (V). However, the compound of the formula (V) can also be added before filtration and drying of the modified support material.

The application of one or more metallocene compounds, preferably ones of the formula (A), and one or more organometallic compounds of the formula (V) to the modified support material is preferably carried out by dissolving or suspending one or more metallocene compounds of the formula (A) in one of the above-described solvents and subsequently reacting it with one or more compounds of the formula (V) which is/are likewise in dissolved or suspended form. The stochiometric ratio of metallocene compound of the formula (A) to an organometallic compound of the formula (V) is from 100:1 to $10^{-4}$:1. The ratio is preferably from 1:1 to $10^{-2}$:1. The modified support material can either be placed directly in the polymerization reactor or in a reaction flask in one of the abovementioned solvents. A mixture of a metallocene compound of the formula (A) and an organometallic compound of the formula (V) is then added. However, if desired, one or more metallocene compounds of the formula (A) can also be added to the modified support material without a prior addition of an organometallic compound of the formula (V).

The ratio of modified support to a metallocene compound of the formula (A) is preferably from 10 g:1 $\mu$mol to $10^{-2}$ g:1 $\mu$mol. The stochiometric ratio of metallocene compound of the formula (A) to the supported cocatalytically active organoboroaluminum compound comprising units of the formula (II) is from 100:1 to $10^{-4}$:1, preferably from 1:1 to $10^{-2}$:1.

The supported catalyst system can be used directly for polymerization. However, it is also possible to remove the solvent and to resuspend the catalyst system for use in the polymerization. The advantage of this activation method is that it offers the option of allowing the polymerization-active catalyst system to be formed only in the reactor itself. This prevents partial decomposition from occurring during introduction of the air-sensitive catalyst.

The supported catalyst system prepared in this way can either be used directly for the polymerization of propylene or be prepolymerized using one or more olefinic monomers before it is used in a polymerization process. The prepolymerization procedure for supported catalyst systems is described, for example, in WO 94/28034.

The present invention also provides a process for preparing polypropylene by polymerization of propylene in the presence of the novel catalyst system comprising at least one transition metal component of the formula (A). For the purposes of the present invention, the term polymerization encompasses both homopolymerization and copolymerization, but refers in particular to homopolymerization of propylene.

The polymerization is carried out at from −60 to 300° C., preferably from 50 to 200° C., very particularly preferably 50–80° C. The pressure is from 0.5 to 2000 bar, preferably from 5 to 64 bar.

The polymerization can be carried out in solution, in bulk, in suspension or in the gas phase, continuously or batchwise, in one or more stages.

The catalyst system of the present invention can be used as sole catalyst component for the polymerization of propylene, but is preferably used in combination with at least one alkyl compound of an element of main groups I to III of the Periodic Table, e.g. an aluminum alkyl, magnesium alkyl or lithium alkyl or an aluminoxane. The alkyl compound is added to the monomer or suspension medium and serves to free the monomer of substances which can impair the catalyst activity. The amount of alkyl compound added depends on the quality of the monomers used.

As molar mass regulator and/or to increase the activity, preference is given to adding hydrogen.

In addition, a mixture of a metal salt of Medialan acid, a metal salt of anthranilic acid and a polyamine can be used as antistatic, as described in EP-A-0,636,636.

Commercially available products such as Stadis® 450 from DuPont, namely a mixture of toluene, isopropanol, dodecylbenzenesulfonic acid, a polyamine, a copolymer of 1-decene and $SO_2$ and also 1-decene or ASA®-3 from Shell and ARU5R® 163 from ICI can likewise be used.

The antistatic is preferably used as a solution; in the preferred case of Stadis® 450, preference is given to using from 1 to 50% by weight of this solution, preferably from 5 to 25% by weight, based on the mass of the supported catalyst used (support together with covalently bound metallocenium-forming compound and one or more metallocene compounds, e.g. of the formula A). The amounts of antistatic required may, however, vary within a wide range depending on the type of antistatic used.

The actual polymerization is preferably carried out in liquid monomer (bulk) or in the gas phase.

The antistatic can be introduced into the polymerization at any point in time. In an example of a preferred procedure, the supported catalyst system is resuspended in an organic solvent, preferably alkanes such as heptane or isododecane. It is subsequently introduced into the polymerization autoclave while stirring. The antistatic is then metered in. The polymerization is carried out at from 0 to 100° C. In a further preferred procedure, the antistatic is introduced into the polymerization autoclave before addition of the supported catalyst system. The resuspended supported catalyst system is subsequently introduced while stirring at from 0 to 100°

C. The polymerization time can be in the range from 0.1 to 24 hours. Preference is given to a polymerization time in the range from 0.1 to 5 hours.

The polypropylenes prepared using the catalyst system of the present invention display a uniform particle morphology and contain no fines. No deposits or caked material occur in the polymerization using the catalyst system of the present invention.

The catalyst system of the present invention gives polypropylenes having extraordinarily high stereospecificity and regiospecificity.

Particular measures of the stereospecificity and regiospecificity of polypropylene are the triad tacticity (TT) and the proportion of 2-1-inserted propene units (RI), both of which can be determined from the $^{13}$C-NMR spectra.

The $^{13}$C-NMR spectra are measured in a mixture of hexachlorobutadiene and $d_2$-tetrachloroethane at elevated temperature (365 K). All $^{13}$C-NMR spectra of the polypropylene samples measured are calibrated on the basis of the resonance signal of $d_2$-tetrachloroethane ($\delta$=73.81 ppm).

To determine the triad tacticity of polypropylene, the methyl resonance signals in the $^{13}$C-NMR spectrum in the range from 23 to 16 ppm are examined; cf. J. C. Randall, Polymer Sequence Determination: Carbon-13 NMR Method, Academic Press New York 1978; A. Zambelli, P. Locatelli, G. Bajo, F. A. Bovey, Macromolecules 8 (1975), 687–689; H. N. Cheng, J. A. Ewen, Makromol. Chem. 190 (1989), 1931–1943. Three successive 1-2-inserted propene units whose methyl groups are located on the same side in the "Fischer projection" are referred to as mm triads ($\delta$=21.0 ppm to 22.0 ppm). If only the second methyl group of the three successive propene units points to the other side, one speaks of an rr triad ($\delta$=19.5 ppm to 20.3 ppm), and if only the third methyl group of the three successive propene units points to the other side, one speaks of an mr triad ($\delta$=20.3 ppm to 21.0 ppm). The triad tacticity is calculated according to the following formula:

$$TT(\%)=mm/(mm+mr+rr)\times100$$

If one propene unit is inserted inversely into the growing polymer chain, this is referred to as a 2-1-insertion; cf. T. Tsutsui, N. Ishimaru, A. Mizuno, A. Toyota, N. Kashiwa, Polymer 30, (1989), 1350–56. The following different structural arrangements are possible:

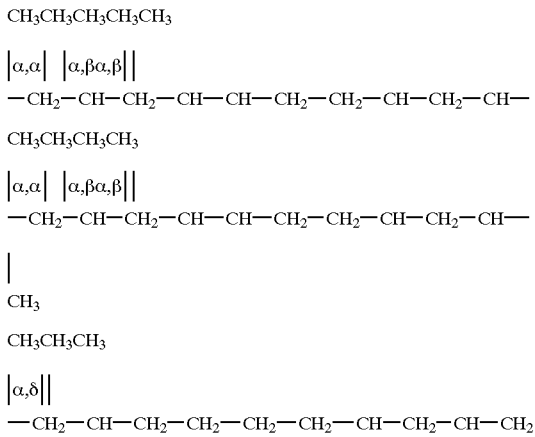

The proportion of 2-1-inserted propene units (RI) can be calculated according to the following formula:

$$RI(\%)=0.5I\alpha,\beta(I\alpha,\alpha+I\alpha,\beta+I\alpha,\delta)\times100,$$

where $I\alpha,\alpha$ is the sum of the intensities of the resonance signals at $\delta$=41.84, 42.92 and 46.22 ppm, $I\alpha,\beta$ is the sum of the intensities of the resonance signals at $\delta$=30.13, 32.12, 35.11 and 35.57 ppm and $I\alpha,\delta$ is the intensity of the resonance signal at $\delta$=37.08 ppm.

The isotactic polypropylene which has been prepared using the catalyst system of the present invention has a proportion of 2-1-inserted propene units RI of <0.5% at a triad tacticity TT of >98.0% and a melting point of >153° C.; $M_w/M_n$, of the polypropylene prepared according to the present invention is in the range from 2.5 to 3.5.

The propylene copolymers which can be prepared using the catalyst system of the present invention have a significantly higher molar mass than those of the prior art. At the same time, such copolymers can be prepared with high productivity at industrially relevant process parameters without deposit formation by use of the catalyst system of the present invention.

The polypropylene prepared by the process of the present invention is particularly suitable for producing hard and stiff shaped bodies having a high tensile strength, e.g. fibers, filaments, injection-molded parts, films, sheets or large hollow bodies (e.g. pipes).

The following examples illustrate the invention but do not restrict its scope.

General information: preparation and handling of the compounds were carried out with exclusion of air and moisture under argon (Schlenk technique). All solvents required were dried before use by boiling for a number of hours over suitable desiccants and subsequent distillation under argon.

EXAMPLE 1

Synthesis of bis(pentafluorophenylboroxy)methylalane 5 ml of trimethylaluminum (2M in toluene, 10 mmol) together with 45 ml of toluene are placed in a reaction vessel. At −40° C., 6.92 g of pentafluoroboronic acid (20 mmol) in 50 ml of toluene are added dropwise to this solution over a period of 15 minutes. The mixture is stirred for 1 hour at −40° C. and subsequently for another hour at room temperature. The turbid solution is filtered through a G4 frit. This gives a clear, colorless solution (0.1M based on Al) of bis(pentafluorophenylboroxy)methylalane in toluene.

EXAMPLE 2

Application of bis(pentafluorophenylboroxy)methylalane to a Support 2 g of SiO2 (PQ MS3030, pretreated at 140° C., 10 mbar, 10 hours) are suspended in 30 ml of toluene, and 0.5 ml of N,N-dimethylaniline is added at room temperature. The mixture is cooled to 0° C. and added dropwise from a dropping funnel to 40 ml of the solution prepared in Example 1. The mixture is allowed to warm to room temperature and is stirred for another 3 hours. The suspension is subsequently filtered and the solid is washed with pentane. The residue is then dried to constant weight in an oil pump vacuum. This gives 4.01 g of a pale purple support material.

EXAMPLE 3

Preparation of Catalyst System 1

0.013 ml of trimethylaluminum (2M in toluene, 25 μmol) is added to 3.9 mg of dimethylsilanediylbis(2-n-propyl-4-

(4'-tert-butylphenyl)indenyl)zirconium dichloride (rac/meso ratio=1:1.5 µmol) in 3 ml of toluene and the mixture is stirred for 6 hours. Subsequently, 0.24 g of the support prepared in Example 2 is added at room temperature. The catalyst suspension is stirred for 1 hour and the solvent is then taken off in an oil pump vacuum. This gives a pink, free-flowing powder.

EXAMPLE 4

Polymerization Using Catalyst System 1

A dry 2 l reactor is flushed firstly with nitrogen and subsequently with propylene and charged with 1.5 l of liquid propylene. 3 ml of TIBA (20% strength in Varsol) are added thereto and the mixture is stirred for 15 minutes. The catalyst system 1 prepared in Example 3 resuspended in 20 ml of heptane is subsequently injected and rinsed in with 15 ml of heptane. The reaction mixture is heated to the polymerization temperature of 60° C. and polymerized for one hour. The polymerization is stopped by venting the remaining propylene. The polymer is dried in a vacuum drying oven. This gives 630 g of polypropylene powder. The reactor displays no deposits on the interior wall or stirrer. The catalyst activity is 161 kg of PP/g of metallocene×h.

EXAMPLE 5

Preparation of Catalyst System 2

0.013 ml of trimethylaluminum (2M in toluene, 25 µmol) is added to 3.9 mg of dimethylsilanediylbis(2-ethyl(4'-tert-butylphenyl)indenyl)zirconium dichloride (rac/meso ratio= 1:1.5 µmol) in 3 ml of toluene and the mixture is stirred for 4 hours. Subsequently, 0.24 g of the support prepared in Example 2 is added at room temperature. The catalyst suspension is stirred for 1 hour and the solvent is then taken off in an oil pump vacuum. This gives a pink, free-flowing powder.

EXAMPLE 6

Polymerization Using Catalyst System 2

A dry 2 l reactor is flushed firstly with nitrogen and subsequently with propylene and charged with 1.5 l of liquid propylene. 3 ml of TIBA (20% strength in Varsol) are added thereto and the mixture is stirred for 15 minutes. The catalyst system 2 prepared in Example 5 resuspended in 20 ml of heptane is subsequently injected and rinsed in with 15 ml of heptane. The reaction mixture is heated to the polymerization temperature of 60° C. and polymerized for one hour. The polymerization is stopped by venting the remaining propylene. The polymer is dried in a vacuum drying oven. This gives 595 g of polypropylene powder. The reactor displays no deposits on the interior wall or stirrer. The catalyst activity is 153 kg of PP/g of metallocene×h.

EXAMPLE 7

Preparation of Catalyst System 3

0.02 ml of trimethylaluminum (2M in toluene, 40 µmol) is added to 3,1 mg of dimethylsilanediylbis(2-methyl-4-phenylindenyl)zirconium dichloride (100% rac; 5 µmol) in 3 ml of toluene and the mixture is stirred for 1 hour. 0.48 g of the support prepared in Example 2 is subsequently added at room temperature. The catalyst suspension is stirred for 1 hour and the solvent is then taken off in an oil pump vacuum. This gives a pink, free-flowing powder.

EXAMPLE 8

Comparative Polymerization Using Catalyst System 3

A dry 2 l reactor is flushed firstly with nitrogen and subsequently with propylene and charged with 1.5 l of liquid propylene. 3 ml of TIBA (20% strength in Varsol) are added thereto and the mixture is stirred for 15 minutes. The catalyst system 3 prepared in Example 7 resuspended in 20 ml of heptane is subsequently injected and rinsed in with 15 ml of heptane. The reaction mixture is heated to the polymerization temperature of 60° C. and polymerized for one hour. The polymerization is stopped by venting the remaining propylene. The polymer is dried in a vacuum drying oven. This gives 320 g of polypropylene powder. The reactor displays no deposits on the interior wall or stirrer. The catalyst activity is 103 kg of PP/g of metallocene×h.

EXAMPLE 9

Polymerization Using Catalyst System 2 in the Presence of Hydrogen

A dry 2 l reactor is flushed first with nitrogen and subsequently with propylene. 0.3 bar of hydrogen are subsequently introduced into the reactor. The reactor is then charged with 1.5 l of liquid propylene. 3 ml of TIBA (20% strength in Varsol) are added thereto and the mixture is stirred for 15 minutes. Subsequently, half of the catalyst system 2 prepared as described in Example 5[=1.95 mg of dimethylsilanediylbis(2-ethyl-4-(4'-tert-butylphenyl) indenyl)zirconium dichloride (rac/meso 1:1; 2.5 µmol) resuspended in 20 ml of heptane is injected and rinsed in with 15 ml of heptane. The reaction mixture is heated to the polymerization temperature of 60° C. and polymerization is carried out for one hour. The polymerization is stopped by venting the remaining propylene. The polymer is dried in a vacuum drying oven. This gives 620 g of polypropylene powder. The reactor displays no deposits on the interior wall or stirrer. The catalyst activity is 318 kg of PP/g of metallocene×h.

The polymerization results from the examples are shown in Table 1.

TABLE I

| Example | rac/meso | Content of rac form | Yield [kg of PP] | Activity [kg of PP/g of met/h] | m.p. [° C.] |
|---|---|---|---|---|---|
| 4 | 1:1 | 50% | 0.630 | 161 | 157 |
| 6 | 1:1 | 50% | 0.595 | 153 | 154 |
| 8 | rac | 100% | 0.640 | 103 | 150 |
| 9 | 1:1 | 50% | 0.620 | 318 | 157 |

We claim:
1. A catalyst system comprising
a) at least one substituted metallocene of formula (A)

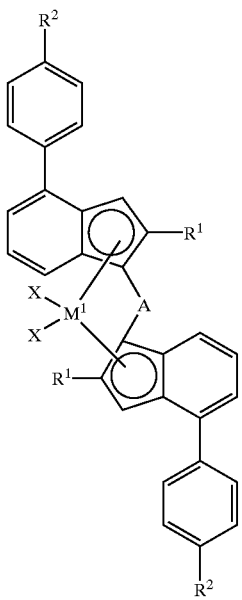

(A)

where
$R^1$ and $R^2$ are identical or different and each represents a hydrogen atom, or a $C_1$–$C_{20}$-hydrocarbon group, with the proviso that $R^1$ is not methyl when $R^2$ is hydrogen,
$M^1$ is a transition metal of group 4, 5 or 6 of the Periodic Table of the Elements,
A is a bridge of formula

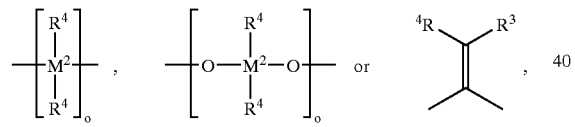

or is $=BR^3$, $=AlR^3$, $-S-$, $=SO$, $=SO_2$, $=NR^3$, $=PR^3$, $=P(O)R^3$, o-phenylene or 2,2'-biphenylene,
where
$M^2$ is carbon, silicon, germanium or tin,
o is 1, 2, 3 or 4,
$R^3$ and $R^4$ are identical or different and each represents a hydrogen atom, halogen, $C_1$–$C_{20}$-alkyl, $C_6$–$C_{14}$-aryl, $C_1$–$C_{10}$-alkoxy, $C_2$–$C_{10}$-alkenyl, $C_7$–$C_{20}$-arylalkyl, $C_7$–$C_{20}$-alkylaryl, $C_6$–$C_{10}$-aryloxy, $C_1$–$C_{10}$-fluoroalkyl, $C_6$–$C_{10}$-haloaryl, $C_2$–$C_{10}$-alkynyl, $C_3$–$C_{20}$-alkylsilyl, $C_6$–$C_{20}$-arylsilyl or $C_7$–$C_{20}$-alkylarylsilyl, or $R^3$ and $R^4$ together form a monocyclic or polycyclic ring system, and
X are identical or different and each X represents a hydrogen atom, a halogen atom, a hydroxyl group, a $C_1$–$C_{10}$-alkyl group, a $C_6$–$C_{15}$-aryl group, a $C_1$–$C_{10}$-alkoxy group, a $C_6$–$C_{15}$-aryloxy group, a benzyl group or an $NR^5{}_2$ group, where $R^5$ are identical or different and each $R^5$ represents a fluorine atom, a chlorine atom, a $C_1$–$C_{10}$-alkyl group, a $C_6$–$C_{15}$-aryl group or a $(CH_3)_3Si$ group,
where the ratio of rac isomer to meso isomer of the metallocene of formula (A) is from 1:10 to 2:1, b) at least one Lewis base of formula (I), $$M^3R^6R^7R^8 \tag{I}$$

where
$R^6$, $R^7$ and $R^8$ are identical or different and each represents a hydrogen atom, a $C_1$–$C_{20}$-alkyl group, a $C_1$–$C_{20}$-haloalkyl group, a $C_6$–$C_{40}$-aryl group, a $C_6$–$C_{40}$-haloaryl group, a $C_7$–$C_{40}$-alkylaryl group or a $C_7$–$C_{40}$-arylalkyl group, where two radicals or all three radicals $R^6$, $R^7$ and $R^8$ are optionally joined to one another via $C_2$–$C_{20}$ units, and
$M^3$ is an element of main group V of the Periodic Table of the Elements,
c) a support,
d) at least one organoboroaluminum compound which is covalently bound to the support, and which is made up of units of formula (II)

$$R_i^9M^4-O-M^4R_j^{10} \tag{II}$$

where
$R^9$ and $R^{10}$ are identical or different and each represents a hydrogen atom, a halogen atom, $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl or $C_7$–$C_{40}$-haloalkylaryl, or $R^9$ is an $-OSiR_3$ group, where R are identical or different and each R is as defined for $R^9$,
$M^4$ are identical or different and each $M^4$ represents an element of main group 3 of the Periodic Table of the Elements, and
i and j are each an integer 1 or 2, and optionally
e) an organometallic compound of formula (V)

$$[M^5R^{11}{}_p]_k \tag{V}$$

where
$M^5$ is an element of main group I, II or III of the Periodic Table of the Elements,
$R^{11}$ are identical or different and each $R^{11}$ represents a hydrogen atom, a halogen atom, a $C_1$–$C_{20}$-alkyl group, a $C_6$–$C_{40}$-aryl group, a $C_7$–$C_{40}$-arylalkyl group or a $C_7$–$C_{40}$-alkylaryl group,
p is an integer from 1 to 3, and
k is an integer from 1 to 4.
2. A catalyst system as claimed in claim 1, wherein $R^1$ and $R^2$ are identical or different and each represents a hydrogen atom, a $C_1$–$C_{20}$-alkyl group, a $C_6$–$C_{14}$-aryl group or a $C_2$–$C_{20}$-alkenyl group, with the proviso that $R^1$ is not methyl when $R^2$ is hydrogen,
$M^1$ is titanium, zirconium, hafnium, vanadium, niobium, tantalum, chromium, molybdenum or tungsten,
A is dimethylsilanediyl, dimethylgermanediyl, ethylidene, methylethylidene, 1,1-dimethylethylidene, 1,2-dimethylethylidene, tetramethylethylidene, isopropylidene, phenylmethylmethylidene or diphenylmethylidene,
X are identical or different and each X represents a hydrogen atom, fluorine, chlorine, bromine, iodine, a hydroxyl group, methyl, ethyl, propyl, isopropyl, n-butyl, isobutyl, sec-butyl, tert-butyl, hexyl, cyclohexyl, phenyl, naphthyl, methoxy, ethoxy, tert-butoxy or an $NR^5{}_2$ group, where $R^5$ are identical or different and each $R^5$ represents methyl, ethyl, a chlorine atom or a fluorine atom, where the ratio of rac isomer to meso isomer of the metallocene of formula (A) is from 1:2 to 3:2.

3. A catalyst system as claimed in claim 1, wherein
$R^1$ and $R^2$ are identical or different and each represents hydrogen, methyl, ethyl, n-propyl, isopropyl, n-butyl, sec-butyl, isobutyl, tert-butyl, pentyl or hexyl, with the proviso that $R^1$ is not methyl when $R^2$ is hydrogen, $M^1$ is zirconium, A is dimethylsilanediyl, dimethylgermanediyl or ethylidene, X are identical or different and each X represents hydrogen, fluorine, chlorine, bromine, a hydroxyl group, methyl, ethyl, propyl, isopropyl, n-butyl, isobutyl, sec-butyl, tert-butyl, hexyl, cyclohexyl, phenyl, naphthyl, methoxy, ethoxy or tert-butoxy, where the ratio of rac isomer to meso isomer of the metallocene of formula (A) is from 1:2 to 3:2.

4. A catalyst system as claimed in claim 1, wherein $R^9$ and $R^{10}$ in formula (II) are $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl or $C_7$–$C_{40}$-haloalkylaryl.

5. A catalyst system as claimed in in claim 1, wherein $R^{11}$ in formula (V) is $C_1$–$C_{20}$alkyl, $C_6$–$C_{40}$-aryl, $C_7$–$C_{40}$-arylalkyl or $C_7$–$C_{40}$-alkylaryl.

6. A catalyst system as claimed in claim 1, wherein the support used is an organic or inorganic, inert solid.

7. A process for preparing polyolefins by polymerization of propylene in the presence of a catalyst system as claimed in claim 1.

8. A process as claimed in claim 7, wherein the polymerization of propylene is carried out in the additional presence of hydrogen.

* * * * *

UNITED STATES PATENT AND TRADEMARK OFFICE
CERTIFICATE OF CORRECTION

PATENT NO. : 6,576,723 B1
DATED : June 10, 2003
INVENTOR(S) : Bohnen et al.

It is certified that error appears in the above-identified patent and that said Letters Patent is hereby corrected as shown below:

Column 20,
Line 7, "$C_1$-$C_{20}$alkyl" should be -- $C_1$-$C_{20}$-alkyl --.

Signed and Sealed this

Sixteenth Day of September, 2003

JAMES E. ROGAN
*Director of the United States Patent and Trademark Office*